UNITED STATES PATENT OFFICE 2,293,420

MANUFACTURE OF LACQUERED SHAPED ARTICLES

Georg Wick, Bitterfeld, Germany
Seized by Alien Property Custodian

No Drawing. Application July 7, 1938, Serial No. 218,017. In Germany July 13, 1937

3 Claims. (Cl. 113—51)

The present invention relates to a process for manufacturing lacquered shaped articles of sheet metal.

It is known practice to coat shaped articles of sheet metal, for example boxes or cans, by immersion in or spraying with a lacquer. The operation is, however, troublesome and tedious. It has, therefore, been proposed to lacquer the sheet metal before the shaping operation; this obviously places a very high requirement on the lacquer. Thus a proposal has been associated heretofore merely with oven-drying lacquers, for instance phenol-formaldehyde-resin lacquers, which must be burnt on the sheet metal before the shaping operation. This invention is based on the observation that air drying lacquers may be used if they have a polyvinyl compound as the lacquer basis. The general properties of polyvinyl resin lacquers, for example good adhesion and stability on bending, are well known; it cannot be expected, however, that they could withstand these strong strains set up during the shaping operation without cracking. A good adhesion and resistance to bending are to be found in a large number of air-drying lacquers, for example those having an acetyl cellulose basis, but these are not suitable for the purpose in question.

As a lacquer basis for this invention there may be used known polyvinyl compounds, for instance polyvinyl acetate, polyacrylic acid esters, mixed polymerisates; on account of their outstandingly high resistance to chemical influences I prefer, however, polyvinyl chloride or after-chlorinated polyvinyl chloride. If there is added to the lacquer a metal powder, for instance aluminium powder, the finished article has the appearance of pure aluminium.

It is especially surprising that a comparatively thin layer of lacquer may be sufficient, for example in the case of polyvinyl chloride 20 grams of lacquer per square metre may be used. The lacquer may be applied advantageously in known manner by means of rollers. The rapidity with which the lacquer dries may be so selected by the choice of one of the numerous solvents for polyvinyl compounds or a mixture of such solvents that the shaping operation can follow the lacquering immediately or nearly immediately. The technical advance as compared with the use of oven-drying lacquers alone for such purposes is that the invention provides an essentially more rapid and cheaper operation.

It may be added that certain polyvinyl compounds show, in comparison with the phenol-formaldehyde-resin lacquers, the advantage that they are more stable to acids and alkalies. Black sheet metal may be coated with lacquers of the following composition; the parts being by weight:

Example 1

| | Parts |
|---|---|
| Polyvinyl chloride, after-chlorinated | 8.7 |
| Butyl acetate | 28.8 |
| Acetone | 34.4 |
| Aldehyde resin of 75 per cent. strength | 6.8 |
| Tricresyl phosphate | 1.2 |
| Softener described in German Patent Specification No. 365,169, Example 1 | 1.7 |
| Cyclohexanone | 3.4 |
| Aluminium bronze | 15 |
| | 100 |

Example 2

| | Parts |
|---|---|
| Polyvinyl chloride, after-chlorinated | 10.47 |
| Alkyd resin of 75 per cent. strength | 8.04 |
| Softener described in German Patent Specification No. 365,169, Example 1 | 1.91 |
| Butyl acetate | 33.91 |
| Solvent naphtha | 40.2 |
| Tricresyl phosphate | 1.53 |
| Cyclohexanone | 3.94 |
| | 100 |

Example 3

| | Parts |
|---|---|
| Polyvinyl chloride, after-chlorinated | 10.56 |
| Alkyd resin of 75 per cent. strength | 4.93 |
| Tricresyl phosphate | 8.45 |
| Acetone | 9.15 |
| A mixture of methyl- and ethyl acetates | 9.15 |
| Butyl acetate | 19.02 |
| Solvent naphtha | 38.74 |
| | 100 |

Example 4

| | Parts |
|---|---|
| Polyvinyl chloride, after-chlorinated | 14 |
| Tricresyl phosphate | 8 |
| Alkyd resin of 75 per cent. strength | 5 |
| Acetone | 10 |
| A mixture of methyl- and ethyl acetates | 10 |
| Butyl acetate | 20 |
| Solvent naphtha | 33 |
| | 100 |

Example 5

| | Parts |
|---|---|
| The lacquer used in Example 4 | 67 |
| Alkyd resin of 75 per cent. strength | 4 |
| Chlorinated diphenyl | 2 |
| Cyclohexanone | 8 |
| Toluene | 17 |
| Methylglycol acetate | 2 |
| | 100 |

Several layers of lacquer may be applied one over the other, for example a ground lacquer may be supplied by Example 2 and on this there may be a covering lacquer especially stable to the attack of chemicals of the following composition:

| | Parts |
|---|---|
| Polyvinyl chloride, after-chlorinated | 11.7 |
| Chlorinated diphenyl | 4.2 |
| Acetone | 10.1 |
| A mixture of methyl- and ethyl acetates | 10 |
| Butyl acetate | 21 |
| Pure toluene | 43 |
| | 100 |

The sheets may be lacquered the same or differently on each side. As pigments there may be used, for instance, aluminium bronze, chromium oxide green, titanium white, iron black. The sheet metals thus covered with an easily drying lacquer can be shaped to any desired form by bending, pressing, stamping, sawing, boring without cracking of the protecting coating. Since the said lacquer dries very rapidly, the shaping operation may be immediately joined to the lacquering process.

What I claim is:

1. In the process of manufacturing shaped articles of sheet metal the steps which comprise coating the sheet metal from which the articles are to be formed with an air-drying lacquer having an after-chlorinated polyvinyl chloride as a basis, drying said coating and then, without subjecting the coated material to a baking treatment, shaping the coated sheet metal into the desired article by pressing, whereby articles are obtained having a corrosion-resistant crack-free coating.

2. In the process of manufacturing shaped articles of sheet metal the steps which comprise coating the sheet metal from which the articles are to be formed with an air-drying lacquer containing an after-chlorinated polyvinyl chloride, an alkyd resin, a plastifying agent and a volatile solvent, drying said coating and then, without subjecting the coated material to a baking treatment, shaping the coated sheet metal into the desired article by pressing, whereby articles are obtained having a corrosion-resistant crack-free coating.

3. Press-shaped articles as obtained according to the process defined in claim 1.

GEORG WICK.